· US009236183B2

United States Patent
Letz et al.

(10) Patent No.: US 9,236,183 B2
(45) Date of Patent: Jan. 12, 2016

(54) CAPACITOR AND METHOD OF MAKING SAME

(71) Applicant: SCHOTT AG, Mainz (DE)

(72) Inventors: Martin Letz, Mainz (DE); Hans-Heinrich Gundelach, Delligsen (DE); Holger Wegener, Alfeld (DE)

(73) Assignee: SCHOTT AG, Mainz (DE)

( * ) Notice: Subject to any disclaimer, the term of this patent is extended or adjusted under 35 U.S.C. 154(b) by 26 days.

(21) Appl. No.: 14/488,381

(22) Filed: Sep. 17, 2014

(65) Prior Publication Data

US 2015/0000830 A1   Jan. 1, 2015

Related U.S. Application Data

(60) Division of application No. 13/205,832, filed on Aug. 9, 2011, now Pat. No. 8,867,191, which is a continuation of application No. PCT/EP2010/000826, filed on Feb. 10, 2010.

(30) Foreign Application Priority Data

Feb. 10, 2009   (DE) .......................... 10 2009 008 292

(51) Int. Cl.
   *H01G 4/08* (2006.01)
   *C03B 17/06* (2006.01)
   (Continued)

(52) U.S. Cl.
   CPC *H01G 4/08* (2013.01); *C03B 17/06* (2013.01); *C03B 33/0215* (2013.01); *C03B 33/091* (2013.01); *C03B 33/093* (2013.01); *C03C 3/091* (2013.01); *C03C 4/16* (2013.01);
   (Continued)

(58) Field of Classification Search
   CPC ......... H01G 4/105; H01G 4/08; H01G 13/01; B29C 53/562; H01F 41/0608; C03B 15/00; C03B 15/02; C03B 17/00; C03B 17/06; C03B 17/061; C03B 17/064; C03B 17/068
   USPC ..................... 156/184–192; 242/444.1–444.5
   See application file for complete search history.

(56) References Cited

U.S. PATENT DOCUMENTS 3,437,892 A   4/1969   Hoffman
3,469,161 A   9/1969   Davis
(Continued)

FOREIGN PATENT DOCUMENTS

CH   397162 A   8/1965
CH   323455 A   7/1975
(Continued)

OTHER PUBLICATIONS

International Search Report from the International Searching Authority dated May 3, 2010 based on corresponding PCT/EP2010/000826.
(Continued)

*Primary Examiner* — Carson Gross
(74) *Attorney, Agent, or Firm* — Ohlandt, Greeley, Ruggiero & Perle, LLP

(57) ABSTRACT

A capacitor having a dielectric consisting of a glass layer with an alkali metal oxide content of at most 2 wt % and a thickness of at most 50 µm is provided. The capacitor includes at least two metal layers which are separated by the glass layer. The glass layer is preferably produced by a down-draw method or by an overflow down-draw fusion method.

16 Claims, 4 Drawing Sheets

(51) Int. Cl.

| | |
|---|---|
| *C03B 33/02* | (2006.01) |
| *C03B 33/09* | (2006.01) |
| *C03C 3/091* | (2006.01) |
| *C03C 4/16* | (2006.01) |
| *H01G 4/10* | (2006.01) |
| *H01G 13/00* | (2013.01) |
| *H01G 13/02* | (2006.01) |
| *B32B 37/14* | (2006.01) |
| *C03B 23/00* | (2006.01) |

(52) U.S. Cl.
CPC .............. *H01G 4/105* (2013.01); *H01G 13/00* (2013.01); *H01G 13/02* (2013.01); *B32B 37/14* (2013.01); *C03B 23/0006* (2013.01); *Y10T 156/1031* (2015.01)

(56) References Cited

U.S. PATENT DOCUMENTS

| | | | |
|---|---|---|---|
| 3,544,330 | A | 12/1970 | Hoffman |
| 3,638,084 | A | 1/1972 | Burn |
| 4,244,722 | A | 1/1981 | Tsuya et al. |
| 4,687,540 | A | 8/1987 | Singhdeo et al. |
| 5,581,435 | A * | 12/1996 | Kinoshita et al. .......... 361/301.5 |
| 6,914,371 | B2 | 7/2005 | Martin et al. |
| 2007/0036996 | A1 | 2/2007 | Sugimoto et al. |
| 2011/0085279 | A1 * | 4/2011 | Lanagan et al. ........... 361/321.1 |

FOREIGN PATENT DOCUMENTS

| | | | | |
|---|---|---|---|---|
| CN | 1427806 | A | 7/2003 | |
| DE | 913329 | C | 6/1954 | |
| DE | 956433 | C | 1/1957 | |
| DE | 1496698 | A1 | 9/1969 | |
| GB | 774009 | A | 5/1957 | |
| JP | 01215736 | A * | 8/1989 | .............. C03B 33/08 |
| JP | 11-111557 | A | 4/1999 | |
| JP | 11288852 | | 10/1999 | |
| JP | 2001-003167 | A | 1/2001 | |
| JP | 2007-100184 | A | 4/2007 | |
| WO | 02051757 | A2 | 7/2002 | |
| WO | 03051783 | A1 | 6/2003 | |
| WO | 2006046361 | A1 | 5/2006 | |

OTHER PUBLICATIONS

Written Opinion from the International Searching Authority dated May 3, 2010 based on corresponding PCT/EP2010/000826.

International Preliminary Report on Patentability from the International Searching Authority dated Aug. 16. 2011 based on corresponding PCT/EP2010/000826.

* cited by examiner

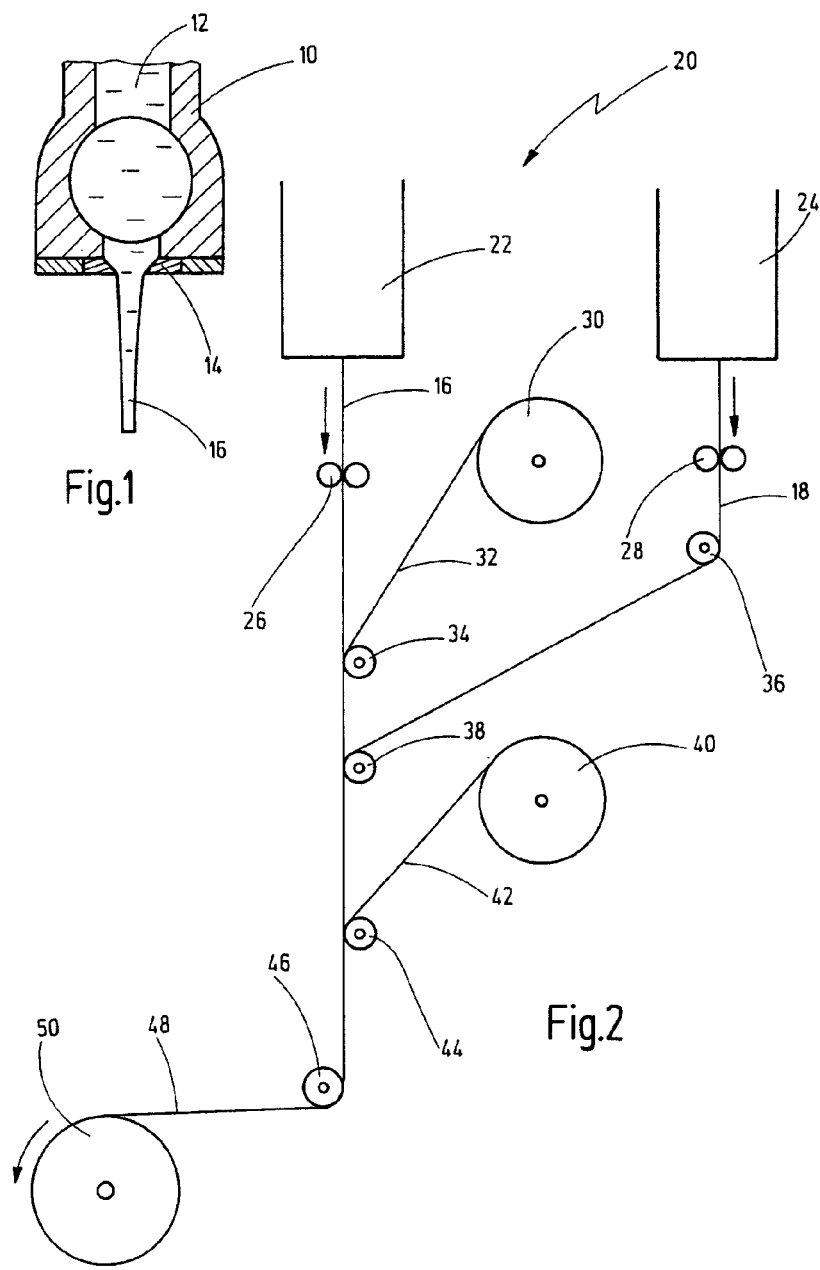

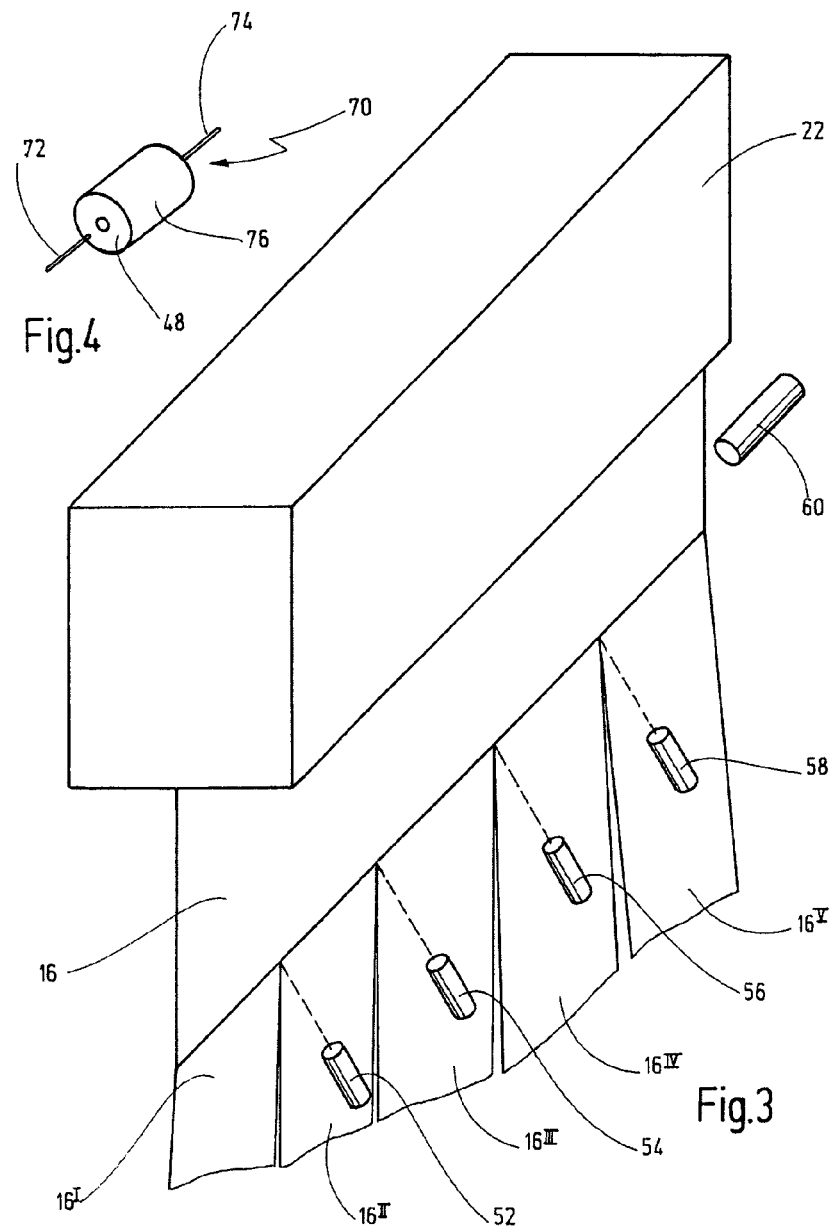

CAPACITOR AND METHOD OF MAKING SAME

CROSS REFERENCE TO RELATED APPLICATIONS

This application is a divisional of Ser. No. 13/205,832, filed on Aug. 9, 2011, which is a continuation of International Patent Application PCT/EP2010/000826, filed on Feb. 10, 2010 designating the U.S., which International Patent Application has been published in the German language and claims the benefit from German patent application 10 2009 008 292.1, filed on Feb. 10, 2009. The entire content of all of these priority applications are incorporated in their entirety herein by reference.

BACKGROUND OF THE INVENTION

1. Field of the Invention

The invention relates to a capacitor having a glass dielectric and to a method for the production thereof.

2. Description of Related Art

The constantly increasing need to store energy for times from microseconds to days with a large amount of electrical energy is necessitating materials having special dielectric properties.

Polypropylene film capacitors are generally used as high-power capacitors in the prior art. They can be rolled, and the dielectric—polypropylene—can be produced in the form of a very thin film. However, the dielectric breakdown voltage of approximately 1 MV/cm limits the density with which energy can be stored.

Electrolyte capacitors can also be brought to very high storage densities. For instance, Jeol in Japan has reported double-layer electrolyte capacitors with storage densities of the order of 20 Wh/l (JP 11288852 A2).

Such electrolytes, however, are in general chemically reactive and environmentally harmful, and in some cases may even be explosive.

Ceramic capacitors are furthermore known which use ceramics as dielectric, for example capacitors comprising ferroelectric phases. However, the residual porosity of ceramics limits their dielectric breakdown field strength.

Batteries, for instance lithium ion batteries, currently give the greatest storage density of up to 800 Wh/l. Batteries, however, have a limited lifetime and, in contrast to capacitors, have charging times of up to several hours.

Glasses as dielectric for capacitors are furthermore known in the prior art. Glass capacitors have been described since the 1940s. They are widely used in electronic applications for satellites and space flight, and can work in very aggressive environmental conditions. It is also known that the dielectric breakdown field strength of glasses is generally greater than that of the corresponding crystal systems. A. Hippel, R. J. Maurer, Phys. Rev., 59, 820 (1941) describe this phenomenon by comparing the breakdown field strength of quartz glass with quartz crystal. The authors indicate a breakdown field strength of the order of 7 MV/cm for quartz glass.

However, the production of capacitors from quartz glass would be an extraordinarily expensive and time-consuming process.

BRIEF SUMMARY OF THE INVENTION

It is a first object of the invention to disclose an improved capacitor having a high reliability.

It is a second object of the invention to disclose an improved capacitor having a high power density.

It is a third object of the invention to disclose an improved capacitor having a glass as dielectric.

It is a forth object of the invention to disclose an improved capacitor having an improved breakdown strength.

It is a fifth object of the invention to disclose a method of making such an improved capacitor.

According to the invention these and other objects are achieved by a capacitor comprising at least two metal layers which are separated by a dielectric configured as a glass layer with a fire-polished surface, the glass layer having an alkali metal oxide content of at most 2 wt % and a thickness of at most 50 μm, preferably at most 40 μm, particularly preferably at most 30 μm.

The object of the invention is furthermore achieved by a method for producing a capacitor, comprising the following steps: providing a glass having an alkali metal oxide content of at most 2 wt %; drawing the glass into a glass strip having a fire-polished surface with a thickness of at most 50 μm; assembling the glass strip with a first metal layer and at least one second metal layer to form a unit; and electrically contacting the two metal layers.

The object of the invention is fully achieved in this way.

Specifically, according to the invention it has been found that when low alkali metal or alkali metal-free glasses are used as dielectric, the dielectric breakdown strength of quartz glass can be achieved and even significantly surpassed.

Furthermore, the breakdown strength is improved considerably by the fire-polished surface.

The use of low alkali metal thin fire-polished glass layers thereby provides a surprisingly simple and economical way of producing capacitors with a high energy storage density.

In a preferred refinement of the invention, the glass layer has a thickness of at least 5 μm, in particular at least 10 μm, in particular at least 15 μm.

It has been found that particularly in this thickness range, preferably with 15-30 μm, a particularly smooth surface is obtained by the stronger drawing of the low alkali metal glasses, which favours a particularly high dielectric breakdown strength.

According to another embodiment of the invention, the capacitor comprises a layer unit which consists of at least a first glass layer on which a first metal layer is provided, on which at least one second glass layer and at least one second metal layer are provided, the layer unit being wound and the two metal layers respectively being electrically connected to terminals.

It has been found that such thin glass layers can also readily be wound, so that a particularly large amount of energy can be stored in a very small space.

In another preferred embodiment of the invention, each glass layer consists of a glass having an alkali metal oxide content of at most 1 wt %, preferably at most 0.5 wt %, more preferably at most 0.1 wt % and particularly preferably at most 0.05 wt %.

By using particularly low alkali metal glasses, the breakdown strength can be increased even further according to the invention.

According to another preferred embodiment of the invention, each glass layer has a quality (ζ) of at least $20 \cdot 10^{12}$ V/mm$^3$, preferably of at least $50 \cdot 10^{12}$ V/mm$^2$, the quality being defined as the ratio of the breakdown field strength to the product of the thickness and the roughness of the surface of the glass layer.

The smaller the thickness of the glass layer is, and the less the roughness of the glass surface is, the better is the breakdown strength, as expressed by this parameter.

When using a glass layer of high quality, it is possible to achieve a particularly high energy density or a particularly small overall size.

According to another preferred embodiment of the invention, each glass layer consists of a glass having an electrical conductivity of at most $10^{-15}$ S/cm.

When using such glasses with a very low electrical conductivity, a time constant for the discharge of the order of minutes to days is obtained. This means that the discharge of the capacitor is determined not by the residual dielectric conductivity but rather by the package of the capacitor and further factors.

According to another configuration of the invention, the glasses used have a dielectric loss angle (tan δ) of at most 0.001 at 1 kHz.

Particularly suitable glasses for producing the dielectric have the following components (in wt % based on oxide):

| | |
|---|---|
| $SiO_2$ | 40-75 |
| $Al_2O_3$ | 1-25 |
| $B_2O_3$ | 0-16 |
| Alkaline-earth metal oxides | 0-30 |
| Alkali metal oxides | 0-2. |

In particular, glasses which contain the following components (in wt % based on oxide) are preferred:

| | |
|---|---|
| $SiO_2$ | 45-70 |
| $Al_2O_3$ | 5-25 |
| $B_2O_3$ | 1-16 |
| Alkaline-earth metal oxides | 1-30 |
| Alkali metal oxides | 0-1. |

Preferably, the maximum mean roughness depth (RMS) is 1 nanometer, preferably at most 0.8 nanometer, particularly preferably at most 0.5 nanometer.

With such a smooth surface, a particularly high dielectric breakdown voltage is achieved. Typically, the maximum mean roughness depth is about 0.4 nanometer for a fire-polished glass layer.

According to a preferred refinement of the method according to the invention, a first and a second glass strip are drawn, and the first glass strip is assembled together with the first metal layer, with the second glass strip and a second metal layer, and wound to form a unit.

It has been found that this allows particularly economical production. In this case, an adhesive layer (for example epoxy adhesive) may be applied between neighbouring layers, for example as a sprayed layer, in order to achieve a permanent bond. As an alternative, the adhesive layer may already be present as a coating on the wound metal layer (metal foil). In this case, a sheet of paper or the like would also need to be wound in as a separating layer, which is then unrolled before bonding to the glass layer.

As a further alternative, each glass strip may first be drawn from the melt and wound with paper to form a roll. Then, at a later time during the method, the metal layer may be applied or the glass strip may be wound together with a metal foil after unrolling the paper layer.

All conceivable metals which are suitable may be envisaged. Aluminium, for instance, has the advantage of being particularly inexpensive. Nickel layers have the advantage of diffusing less, but they are more expensive. Although the silver layers are even more expensive, they nevertheless have the advantage of particularly good electrical conductivity, although they lead to greater diffusion. It is to be understood that suitable alloys may naturally also be used.

According to the invention, production of each glass strip by the down-draw method or by the overflow down-draw fusion method is particularly preferred.

It has been found that both methods, which are widely known in the prior art (cf. for example WO 02/051757 A2 for the down-draw method and WO 03/051783 A1 for the overflow down-draw fusion method) are particularly suitable for drawing thin glass strips of 50 µm or less. Since both methods are fundamentally known, they will not be explained in further detail here. For details, reference is made to WO 02/051757 A2 and to WO 03/051783 A1, the disclosure of which is fully incorporated by reference here.

In a preferred refinement of the invention, each glass strip is separated into a plurality of individual strips by means of a laser cutting device after it has been drawn.

This simplifies the method sequence for the production of small capacitors starting from relatively wide glass strips. The use of a laser cutting method ensures very nondestructive separation of the glass strip into smaller glass strips, which preferably also gives a surface like a fire-polished surface on the edges. In this way, a particularly high dielectric breakdown voltage can be ensured.

According to another configuration of the invention, each glass strip is drawn to an even smaller thickness by a down-draw method after it has been drawn.

Since glass strips with a small thickness are particularly preferred, even thinner glass strips with an even further improved surface can thus be produced according to the invention, so that the energy density of the capacitor produced can be increased further.

It is to be understood that all the features mentioned above and yet to be explained below may be used not only in the combination respectively indicated, but also in other combinations or individually, without departing from the scope of the invention.

BRIEF DESCRIPTION OF THE DRAWINGS

Other features and advantages of the invention may be found in the following description of preferred exemplary embodiments with reference to the drawing, in which:

FIG. 1 shows a nozzle device for drawing a glass strip by the down-draw method;

FIG. 2 shows a greatly simplified representation of an apparatus for producing and winding a unit comprising two glass layers and two metal layers, which are combined with one another in alternating sequence, the two glass layers respectively being produced by the down-draw method;

FIG. 3 shows a simple representation of an apparatus for drawing a glass strip by the down-draw method with a subsequent laser cutting device for separating the produced glass strip into a plurality of individual glass strips;

FIG. 4 shows a schematic view of a capacitor according to the invention;

DESCRIPTION OF PREFERRED EMBODIMENTS

Figure 5:
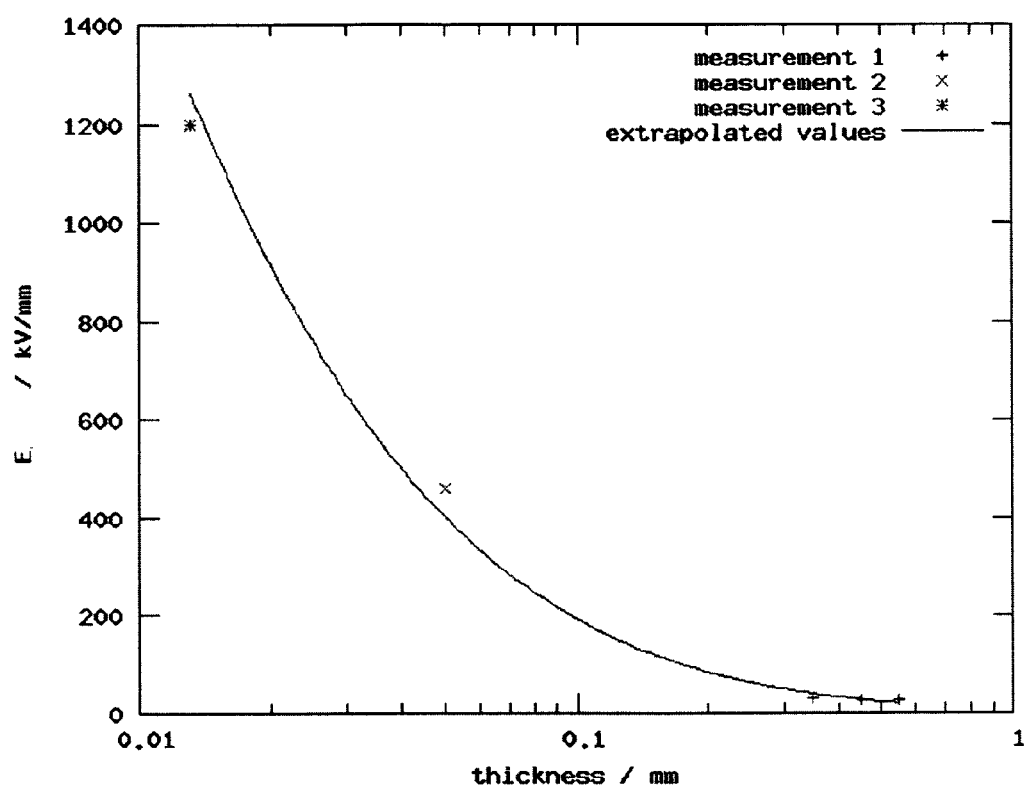
FIG. 5 shows the relationship between the breakdown field strength (in kV/mm) and thickness (mm)

FIG. 1 shows a nozzle device 10 of fundamentally known design, which is used in a down-draw method in order to draw sheet glass very thinly with extremely high precision. In the down-draw method, which is generally described in WO 02/051757 A2, bubble-free and highly homogenized glass flows into a glass reservoir, the so-called drawing tank. The drawing tank consists of noble metals, for instance platinum or platinum alloys. A nozzle device 10 comprising a slit nozzle 14 is arranged below the drawing tank. The size and shape of this slit nozzle 14 define the through-flow of the glass strip 16 being drawn and its thickness distribution over the width of the glass strip. The glass strip is drawn downward by using drawing rollers 26, 28 (FIG. 2) and lastly passes through an annealing oven (not shown) which follows on from the drawing rollers. The annealing oven slowly cools the glass down to room temperature, in order to avoid stresses in the glass. The speed of the drawing rollers defines the thickness of the glass strip. After the drawing process, the glass is bent from the vertical position to a horizontal position for further processing.

The glass strip 16 produced may, as is known in the prior art, be wound together with paper to form a roll. For further production of the capacitor, the paper must then be unrolled again at a later time and in its place a metal foil, for example a thin aluminium foil, must be brought in contact with the glass. In order to produce a capacitor, for instance according to FIG. 4, a first glass strip is then wound together with a metal foil, followed by a second glass strip, followed by a second metal foil, to form a unit, and brought to the size of the end product. The two metal foils electrically insulated from one another by the glass layer are then provided with terminals 72, 74, so that a capacitor 70 is obtained. The wound unit 48 according to FIG. 4 is preferably also enclosed by a package 76, which may for example be produced by melting a glass with a relatively low melting point around it.

FIG. 2 schematically represents an apparatus 20 for producing a unit 48, consisting of a first glass layer, followed by a metal foil, followed by a second glass layer, in turn followed by a second metal layer, and winding it onto a roll 50. A first glass strip 16 emerges from a first drawing device 22 and is drawn by drawing rollers 26. After sufficient cooling, the glass strip 16 is wound together with a metal foil, for example an aluminium foil 32, which is unwound from a roll 30 and delivered via a guide roller 34. From a second drawing device 24, a second glass strip 18 is drawn via drawing rollers 28 and is subsequently delivered via guide rollers 36, 38 onto the surface of the metal foil 32.

A second metal foil, for instance in the form of an aluminium foil 42, is subsequently unwound from a roll 40 and delivered via a guide roller 44. The unit 48 formed in this way is optionally wound via further guide rollers 45 onto a roll 50. In this case, it is necessary to take care that the first metal foil protrudes only on one side and the second metal foil only on the other side, in order to avoid arcing or short circuits.

Lastly, it can be seen from FIG. 3 that each glass strip may be separated into a plurality of individual strips, which is preferably carried out immediately after drawing the glass strip 16 on the drawing device 22. FIG. 3 schematically represents a glass strip 16 drawn from the drawing device 22. The representation of drawing rollers, cooling zones and the like has been omitted for the sake of clarity. After leaving the drawing device 22, the glass strip 16 is first automatically checked by means of an inspection device 60. This may, for example, involve a camera-based system. Subsequently, the glass strip 16 is divided by means of a laser cutting device comprising a plurality of lasers 52, 54, 56, 58 into a series of individual strips $16^I$, $16^{II}$, $16^{III}$, $16^{IV}$, $16^V$. These individual strips $16^I$, $16^{II}$, $16^{III}$, $16^{IV}$, $16^V$, with a width of for example 10 cm each, may be processed further in a way corresponding to that of FIG. 2, or may respectively be wound with paper.

EXAMPLES

Glass strips of the glass D263 with a thickness of 30 μm and glass strips of the glass AF45 with a thickness of 50 μm were produced by the down-draw method and each wound together with paper.

The suitability of the glass sheets produced for the production of capacitors was subsequently tested.

The typical composition of the two glasses AF45 and D263, both of which are manufactured and marketed by Schott AG, is summarized in Table 1.

The glass AF45 is accordingly an alkali metal-free glass, which is particularly preferred according to the invention. Conversely, the glass D263 is a comparative example since it contains 16 wt % of alkali metal oxides.

The mean roughness (RMS) according to DIN ISO 1302, also referred to as an arithmetic mean roughness value ($R_a$), for both glass strips lies between about 0.4 and 0.5 nm. The surface is thus extremely smooth. The dielectric breakdown strengths of the two glass strips AF45 and D263 were determined. A high breakdown strength of about 5 to 7 MV/cm was found for the glass sheet made of AF45 with a thickness of 50 μm.

TABLE 1

| | Composition (wt %) | |
|---|---|---|
| | AF45 | D263 |
| $SiO_2$ | 59 | 57 |
| $Al_2O_3$ | 10 | 6 |
| $B_2O_3$ | 15 | 9 |
| BaO | 25 | — |
| ZnO | — | 7 |
| $TiO_2$ | — | 5 |
| Alkali metal oxides | — | 16 |

For the comparative example made of D263, an average breakdown strength of only about 4 MV/cm was found. This means that the dielectric breakdown strength of the alkali metal-free glass AF45 is much better than that of the glass D263 containing alkali metal. In this context, it should be taken into account that it is generally known that the breakdown strength of a dielectric increases with a decreasing thickness (to a certain limit value). This therefore shows the significantly improved breakdown strength of the alkali metal-free glass AF45, since a higher breakdown strength was measured despite the greater thickness.

The total energy density E is related to the field strength U/d as follows:

$$E = \frac{1}{2} \cdot \varepsilon_0 \cdot \varepsilon \cdot \left(\frac{U}{d}\right)^2,$$

where $\varepsilon_0 = 8.854187 \cdot 10^{-12}$ As/Vm is the dielectric field constant, $\varepsilon$ is the relative permittivity, U is the applied voltage and d is the thickness of the dielectric.

The relative permittivity for AF45 was determined as 6.2. Assuming a dielectric breakdown field strength of 7 MV/cm, an energy density of $20 \cdot 10^6$ Ws/m³ is obtained for the glass AF45, which corresponds to 3.7 Wh/l.

TABLE 2

| Composition (wt %) | AF32 | AF37 | 8252 |
|---|---|---|---|
| SiO$_2$ | 61 | 57 | 60 |
| Al$_2$O$_3$ | 18 | 17 | 14.5 |
| B$_2$O$_3$ | 10 | 8 | 4.5 |
| CaO | 5 | 2 | 10 |
| BaO | 3 | 3 | 9 |
| MgO | 3 | 5 | 2 |
| ZnO | — | — | — |
| TiO$_2$ | — | — | — |
| SrO | — | — | — |
| Alkali metal oxides | — | — | — |
| Remainder | — | 2 | — |

Assuming the expected higher dielectric breakdown field strength of 12 MV/cm, an energy density of about $40 \cdot 10^6$ Ws/m$^3$ is obtained for a thinner glass sheet for the glass AF45, which corresponds to 11 Wh/l.

For the glass D263 which contains about 16 wt % of alkali metal oxides, conversely, a dielectric breakdown strength of merely about 4 MV/cm was determined, which leads to a correspondingly lower characteristic energy density.

The significantly higher dielectric breakdown strength of the glass AF45 compared with the glass D263 is attributed to the alkali metal freedom of the glass AF45.

It is assumed that other alkali metal-free glasses, for example AF32, AF37 and 8252, which are likewise manufactured and marketed by Schott-AG, lead to similarly good results. The compositions of these glasses are indicated in Tab. 2.

Table 3 summarizes further alkali metal-free glasses which are particularly suitable for the capacitor production according to the invention.

TABLE 3

| Composition (wt %) | 1 | 2 | 3 | 4 |
|---|---|---|---|---|
| SiO$_2$ | 63 | 56 | 60 | 59 |
| Al$_2$O$_3$ | 17 | 11 | 17 | 15 |
| B$_2$O$_3$ | 10 | 6 | 8 | 10 |
| CaO | 10 | 3 | 4 | 6 |
| MgO | — | 2 | 4 | — |
| BaO | — | 15 | — | 4 |
| SrO | — | 7 | 7 | 6 |

It is to be understood that the aforementioned glasses according to Tabs 1 to 3 may contain up to about 0.5 wt % of alkali metal oxides as impurities (owing to contamination of the raw materials and melting out from the refractory cladding).

Figure 6:
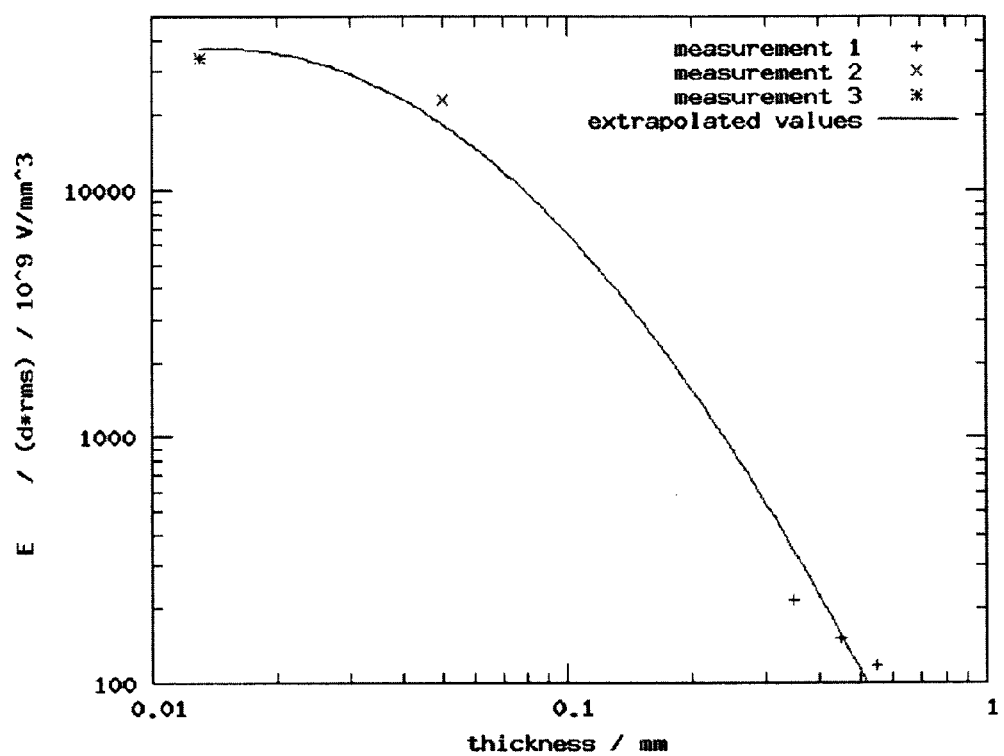
FIG. 6 shows the quality (ζ) (V/mm³) of the glass layer as a function of thickness (mm).

FIG. 6 graphically represents the relationship between the breakdown field strength (kV/mm) and the thickness of the glass layer (mm) for the glass AF45. It can be seen that the breakdown field strength increases with a smaller thickness.

FIG. 7 shows the quality of the glass layer (V/mm$^3$) as a function of the sample thickness (mm) for the glass AF45, a value of 0.4 nanometer (typical of fire-polished surfaces) being assumed for the RMS roughness. It can be seen that particularly advantageous values lie above $20^{12}$ V/mm$^3$. Maximum energy densities are thereby achieved.

What is claimed is:

1. A method of producing a capacitor, comprising:
   providing a glass being essentially free of alkali metal oxides;
   drawing said glass into a glass strip having a fire-polished surface with a thickness of at most 50 μm;
   assembling said glass strip with a first metal layer and a second metal layer to form a unit; and
   electrically contacting said first and second metal layers.

2. The method of claim 1, wherein said drawing step comprises drawing a first and a second glass strip, wherein said assembling step comprises assembling said first glass strip together with said first metal layer and assembling said second glass strip together with said second metal layer, and further comprising winding said assembled first and second glass strips and said first and second metal layers to form a unit.

3. The method of claim 2, further comprising placing an adhesive layer placed between said first glass strip and said first metal layer and between said second glass strip and said second metal layer.

4. The method of claim 2, wherein said first and second glass strips are produced by a down-draw method or an overflow down-draw fusion method.

5. The method of claim 1, further comprising separating said glass strip into said first and second glass strips after drawing by laser cutting.

6. The method of claim 1, further comprising further drawing said glass strip an even smaller thickness by a down-draw method after said drawing step.

7. The method of claim 1, wherein said thickness of said glass strip is at least 5 μm.

8. The method of claim 1, wherein said thickness of said glass strip is at most 30 μm.

9. The method of claim 1, wherein said glass comprises the following components in weight percent based on oxide:

| | |
|---|---|
| SiO$_2$ | 45-70; |
| Al$_2$O$_3$ | 5-25; |
| B$_2$O$_3$ | 1-16; |
| alkaline-earth metal oxides | 1-30; and |
| alkali metal oxides | 0-1. |

10. The method of claim 1, wherein said glass comprises the following components in weight percent based on oxide:

| | |
|---|---|
| SiO$_2$ | 40-75, |
| Al$_2$O$_3$ | 1-25, |
| B$_2$O$_3$ | 0-16, |
| alkaline-earth metal oxides | 0-30, and |
| alkali metal oxides | 0-2. |

11. The method of claim 1, wherein said glass has an electrical conductivity of at most $10^{-15}$ S/cm.

12. The method of claim 1, wherein said glass has a dielectric loss angle of at most 0.001 at 1 kHz.

13. The method of claim 1, wherein the step assembling said glass strip with a first metal layer and said second metal layer to form the unit comprises:
   winding said first and second metal layers and said glass strip; and
   electrically connecting said first and second metal layers to terminals, respectively.

14. The method of claim 1, wherein said glass strip has a maximum mean roughness depth of at most 1 nanometer.

15. The method of claim 1, wherein said glass has a quality of at least $20 \cdot 10^{12}$ V/mm$^3$, said quality being defined as a ratio of a breakdown field strength to a product of a thickness and a roughness of a surface of said glass strip.

16. The method of claim 1, further comprising laser cutting said glass to form a fire-polished surface on edges that have been laser cut.

* * * * *